(12) United States Patent
Sanders et al.

(10) Patent No.: US 6,920,890 B2
(45) Date of Patent: Jul. 26, 2005

(54) AIRFLOW CONTROLLER

(75) Inventors: Bobby W. Sanders, Westlake, OH (US); Charlotte A. Sanders, Westlake, OH (US); Lois J. Weir, North Canton, OH (US)

(73) Assignee: Techland Research, Inc., North Olmsted, OH (US)

( * ) Notice: Subject to any disclaimer, the term of this patent is extended or adjusted under 35 U.S.C. 154(b) by 2 days.

(21) Appl. No.: 10/209,174

(22) Filed: Jul. 30, 2002

(65) Prior Publication Data

US 2003/0034066 A1 Feb. 20, 2003

Related U.S. Application Data

(60) Provisional application No. 60/308,627, filed on Jul. 30, 2001.

(51) Int. Cl.[7] ............................................. F16K 11/14
(52) U.S. Cl. ..................... 137/12; 137/15.1; 137/15.2; 137/601.13
(58) Field of Search ............................... 137/15.1, 15.2, 137/601.01, 601.12, 601.13, 12

(56) References Cited

U.S. PATENT DOCUMENTS 2,734,529 A * 2/1956 Harrison ................. 137/601.12
3,426,668 A * 2/1969 Hofmeister et al. ...... 137/625.33
3,799,475 A * 3/1974 Mitchell et al. ............ 137/15.1
3,941,336 A * 3/1976 Nangia ...................... 137/15.1
3,949,775 A * 4/1976 Cornell ....................... 137/869
2001/0025658 A1 * 10/2001 Bartlett ................... 137/601.01

OTHER PUBLICATIONS

Bobby W. Sanders & Glenn A. Mitchell, Throat–Bypass Bleed Systems for Increasing the Stable Airflow Range, Etc., NASA Tech. Memorandum, NASA, Washington, D.C., May 1973.

Bobby W. Sanders & Glenn A. Mitchell, Increasing the Stable Operating Range of a Mach 2.5 Inlet, Amer. Inst. of Aeronautics & Astronautics, New York, NY, Jun. 1970.

* cited by examiner

*Primary Examiner*—Gerald A. Michalsky
(74) *Attorney, Agent, or Firm*—Calfee, Halter & Griswold, LLP

(57) ABSTRACT

The invention provides an airflow controller for a propulsion inlet system including a bleed section having two or more bleed plenum chambers, each of the chambers having a porous inlet surface and an exit surface and two or more plates slidably mounted to the bleed section and in fluid communication with the exit surface of the bleed section; and two or more plates being adjustable in multiple positions with respect to the exit surface of the bleed plenum chambers.

21 Claims, 11 Drawing Sheets

AIRFLOW CONTROLLER

RELATED APPLICATIONS

This application claims the benefit of U.S. provisional application Ser. No. 60/308,627 filed on Jul. 30, 2001, which is hereby incorporated by reference.

FIELD OF THE INVENTION

This invention relates in general to aircraft inlet propulsion systems, and, more particularly, to airflow controllers for high-speed inlets.

BACKGROUND

Prior art mixed-compression inlets have been selected for application to supersonic propulsion systems for supersonic aircraft that cruise at Mach numbers higher than 2.0. For mixed-compression inlets, maintaining the terminal shock at the inlet throat station provides optimum internal performance. This operation provides high-pressure recovery and minimizes flow distortion at the engine face. These inlets, however, have a discontinuous airflow characteristic known as inlet unstart. For these conventional mixed-compression inlets that employ simple, basic fixed-exits on the inlet bleed systems, a small airflow transient can cause the terminal shock to be displaced forward of the throat position, where it is unstable and is abruptly expelled ahead of the inlet cowl. This shock expulsion or unstart causes a sharp reduction in mass flow and pressure recovery and a large drag increase. Inlet buzz, engine compressor stall, and/or combustor blowout may also occur. Obviously, an inlet unstart is extremely undesirable because of the adverse effects not only on the propulsion system itself, but also on the aerodynamics of the aircraft. If inlet unstart does occur, complex mechanical variations to alter the inlet geometry are required to re-establish the initial operating condition. Certification of an inlet that could unstart has been a concern since the U.S. Supersonic Commercial Transport (SST) program of the 1960's.

Both external airflow transients such as atmospheric turbulence and internal airflow changes such as a reduction in engine airflow demand can cause the inlet to unstart. For an internal airflow change, the inlet should provide a margin in corrected airflow below the value that provides optimum performance without incurring unstart. This margin is defined as the stable operating range. Conventional mixed-compression inlets may be designed to have a limited stable range that is provided by the capability of the performance bleed system to spill increased airflow as the terminal shock moves upstream in the throat region. However, with performance bleed exit areas that are fixed, this stable range may not be adequate to absorb many of the airflow transients that are encountered by a supersonic propulsion system. An increased stable margin is currently provided for these inlets by operating them supercritically with a resultant loss in performance. Since any loss in inlet efficiency is related directly as a loss in thrust of the propulsion system, supercritical operation is undesirable.

In the prior art, based on existing aircraft, inlet performance is compromised to obtain increased stability margin. These aircraft incorporate fixed exits on the bleed systems. Therefore, the inlets must be operated with increased bleed at the nominal operating condition and at a reduced total pressure recovery to maintain a sufficient operability margin. This compromised inlet operation significantly reduces the overall efficiency. Actual flight operation of a complex valve control system on an inlet stability bleed system has not been accomplished.

To provide the necessary inlet stability without compromising steady state performance, the inlet can be designed to allow the throat bleed to function as a throat stability bleed system. This system prevents inlet unstart by allowing the throat bleed to compensate naturally for changes in diffuser exit airflow demand. Past experimental research data on large scale inlet models have shown that large increases in bleed may be provided as the inlet operation proceeds from supercritical to minimum stable (just prior to inlet unstart) conditions, without prohibitive amounts of bleed during normal operation, if the bleed exit area can be controlled by a valve to maintain a near constant pressure in the throat bleed plenum (Sanders, Bobby W.; and Mitchell, Glenn A.: Throat Bypass Bleed Systems for Increasing the Stable Airflow Range of a Mach 2.50 Axisymmetric inlet with 40-Peecent Internal Contraction. NASA TM X-2779, May 1973). This area variation can be provided by an active control that senses shock position and regulates valve exit areas or by high-speed valves that react to bleed plenum pressure changes that occur when the terminal shock changes position.

In the prior art, based on experimental research testing, inlet stability-bleed airflow has been controlled during research studies by poppet valves, by vortex valves, and by research hardware that provided a variable exit area capability. Poppet valves, such as described in U.S. Pat. No. 3,799,475, when used with an inlet stability bleed system can provide very large stable operating margins. However, a requirement of a large volume inside the cowl is inherent in the application of this valve concept. In order to control and pass large amounts of airflow during transients in the inlet airflow, airflow must be exhausted around the periphery of the valve. A large internal cowl volume to house the valve and for ducting of the inlet flow to the valves may lead to high inlet external cowl angles and thus increased drag. Vortex valves (Sanders, Bobby W.; and Mitchell, Glenn A.: Increasing the Stable Operating Range of a Mach 2.5 Inlet. American Institute of Aeronautics and Astronautics, AIAA Paper 70-686. June 1970) can offer a more compact integration into the inlet cowling; however, the capability of vortex valves in providing increased inlet operability margin is limited. The vortex valves also require a high-pressure control airflow with an associated performance penalty. While the valves described above may be used for some applications, valves that can simultaneously control bleed from several bleed regions and allow the use of low profile external cowling to minimize drag are required. This type of valve is disclosed herein.

DRAWINGS

FIG. 6 shows the sliding mechanism of the airflow controller in a closed position.

FIG. 7 shows the sliding mechanisms of the airflow controllers in an open position to allow the removal of the inlet bleed airflow;

DETAILED DESCRIPTION OF THE INVENTION

Figure 1:
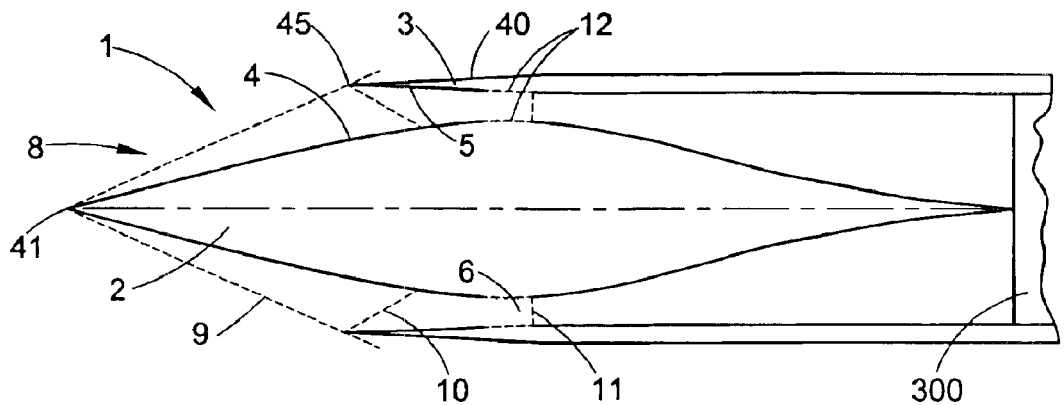
FIG. 1 is a cross-sectional view of a prior art supersonic inlet with bleed in the throat region.
Figure 2:
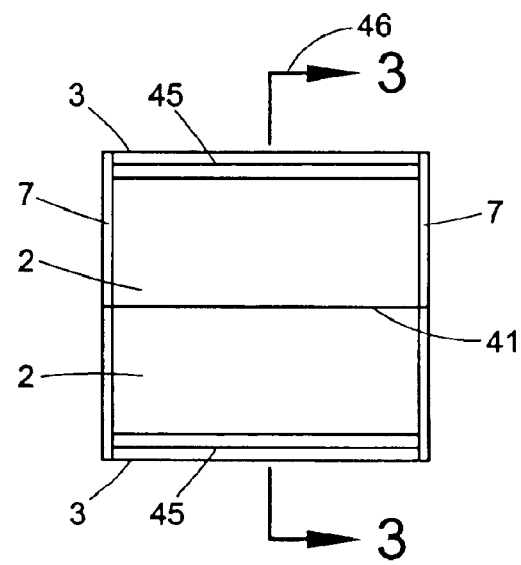
FIG. 2 is a downstream end view of the inlet of FIG. 1.

A cross-sectional drawing of a prior art inlet 1 of an air breathing propulsion system for a high-speed aircraft is presented in FIG. 1. The high-speed inlet 1 is composed of a centerbody 2 and a cowl 3. The cowl 3 has a leading edge 45, an inner surface 5 and an outer surface 40. The centerbody surface 4 and inner cowl surface 5 form a channel in which the high-speed airflow 8 is ducted to the jet engine 300. The supersonic airflow 8 is progressively slowed by oblique shocks 9 and 10 and by a continued contraction of the internal duct area to the inlet throat 6 or minimum flow area of the inlet 1. The main duct airflow then passes through a terminal shock wave 11 that reduces the airflow to subsonic (below the speed of sound) conditions. Then as the airflow proceeds towards the engine 300, the increase in duct area that is obtained by the divergence of surfaces 4 and 5 causes a reduction in the velocity of the airflow to levels acceptable for the engine 300. A porous bleed 12 is located on the inner cowl surface 5 and on the centerbody surface 4 in the throat region 6 of the inlet 1 to remove inlet boundary layer and to provide tolerance to internal and external disturbances in airflow. FIG. 2 shows that the centerbody 2 and cowls 3 extend between two sidewalls 7. The inlet duct cross section is rectangular from the leading edge 41 to the throat 6 of the inlet 1. Downstream of the throat 6, the cross section of each of the two ducts transitions from a rectangular cross-section to a semi-circle. The two semi-circles form the round entrance for the engine 300.

Figure 3:
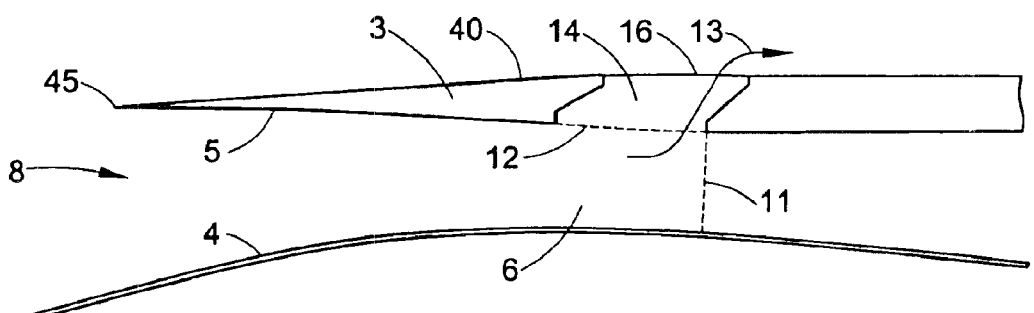
FIG. 3 is a cross-sectional view of the supersonic inlet of FIG. 1 illustrating the bleed in the throat region.

FIG. 3 is a cross-sectional, expanded view of the prior art inlet 1 that provides more detail of the inlet throat region 6. The figure shows that a bleed plenum 14 is formed between the porous bleed region 12 located on the inner surface 5 of the cowl 3 and the overboard exit 16 that is located in the external surface 40 of the cowl 3. Bleed airflow 13 is removed from the inlet through the porous surface 12, is ducted through the plenum 14, and is ducted overboard through the exit 16. For conventional inlet designs the overboard exit 16 is typically a very small opening that restricts the amount of bleed airflow 13 that can be removed to an amount that is required for on-design inlet performance. The bleed plenum 14 region of the inlet is the location where the airflow controller of the invention is installed.

Figure 4:
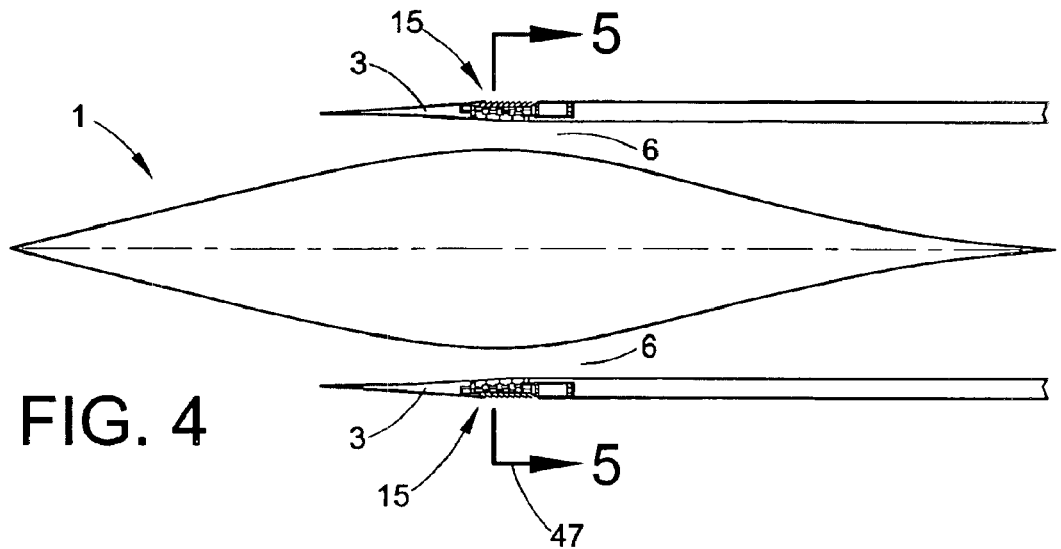
FIG. 4 is a cross-sectional view of a supersonic inlet with an airflow controller of the invention.
Figure 5:
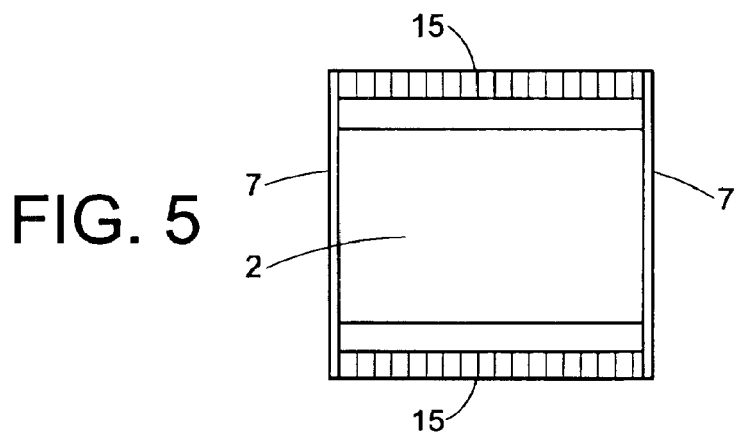
FIG. 5 is a cross-sectional view in the direction 5—5 of FIG. 4.
Figure 6:
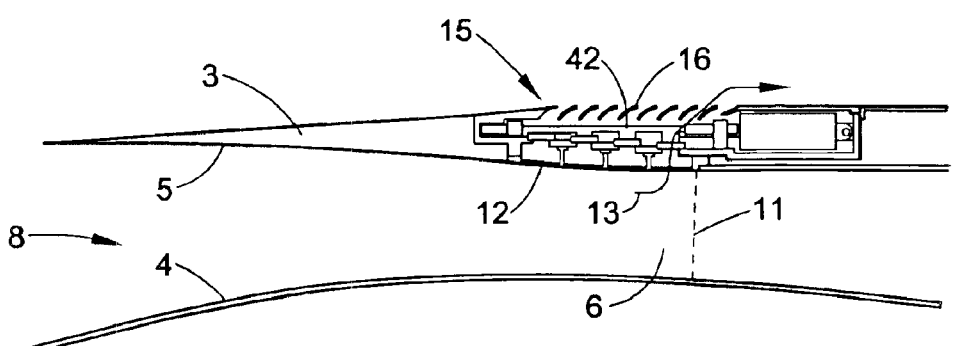
FIG. 6 is a cross-sectional view of the inlet of the invention illustrating the functioning of the airflow controller as a valve control for the stability bleed of an inlet.
Figure 7:
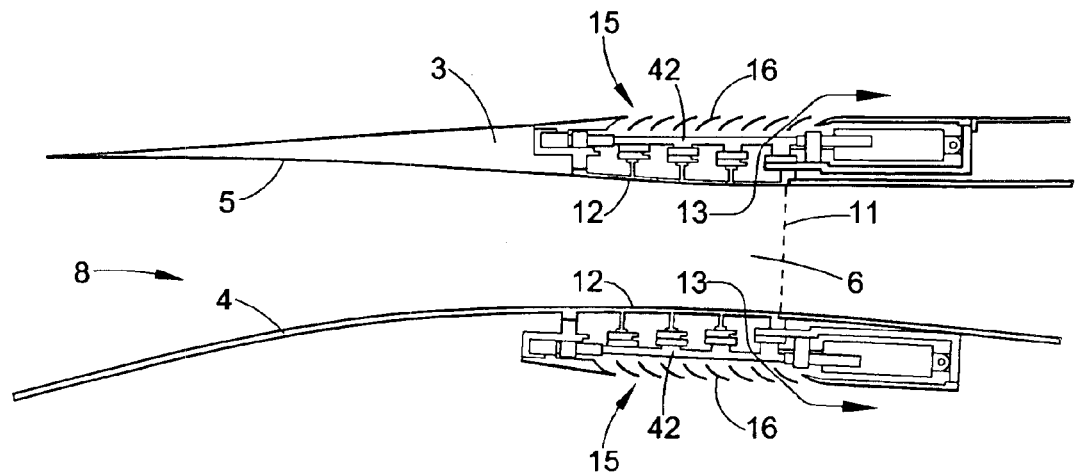
FIG. 7 is a cross-sectional view of inlets of the invention on the cowl and the centerbody illustrating the functioning of the airflow controllers as valve controls for the stability bleed of the inlets.
Figure 7A:
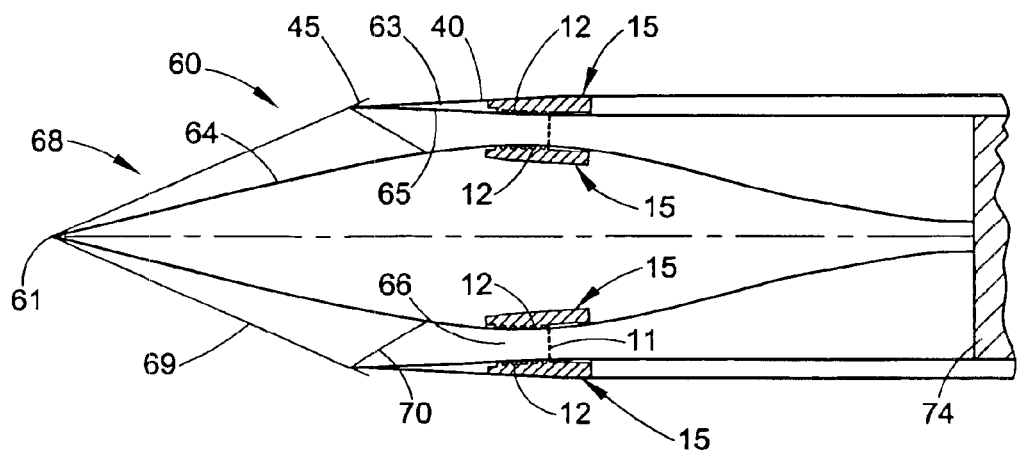
FIG. 7a illustrates a rectangular cross-sectional view of an airflow controller according to the present invention.
Figure 7B:
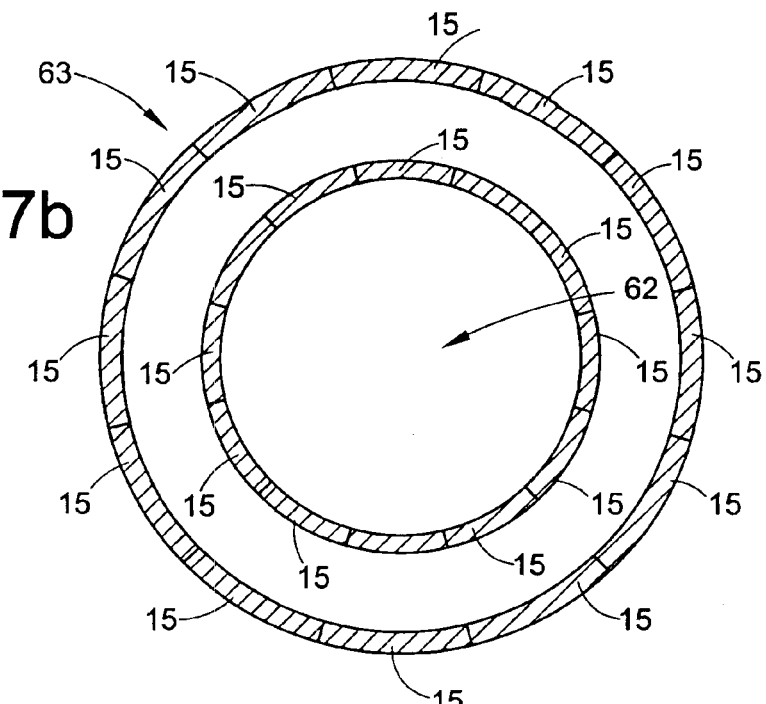
FIG. 7b illustrates cross-sectional views of annular segments of an airflow controller according to the present invention.

FIG. 4 illustrates the physical location of the airflow controller 15 of the present invention with respect to the inlet 1. It is preferred that an airflow controller 15 be installed in each cowl 3. The airflow controller 15 extends from one inlet sidewall 7 to the other inlet sidewall 7 as shown in FIG. 5. Larger views of the airflow controller 15 installed in the inlet cowl 3 are presented in FIGS. 6 through 9. FIG. 6 shows the airflow controller 15 with the sliding mechanism 42 positioned so that the airflow paths between the porous surface 12 and the exit louvers 16 are closed. The sketch of FIG. 7 shows airflow controllers in the cowl 3 and on the centerbody surface 4, Furthermore, FIG. 7 shows the sliding mechanisms in the open position so that bleed airflows 13 can be removed from the inlet inner duct 6 through the porous regions 12 and ducted overboard through the exit louvers 16. FIG. 7a illustrates cross-sectional views of annular segments of an airflow controller 15. FIG. 7b illustrates cross-sectional views of annular segments of an airflow controller 15.

Figure 8:
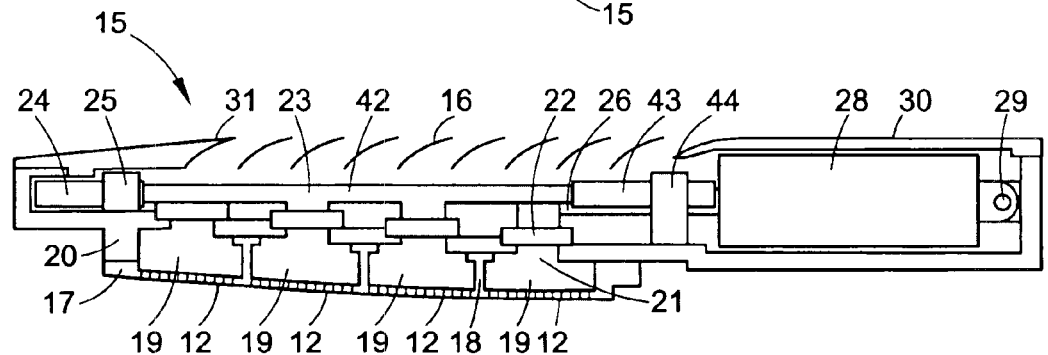
FIGS. 8 and 9 are cross-sectional views of the airflow controller with the sliding mechanism in the closed and open positions, respectively.
Figure 8A:
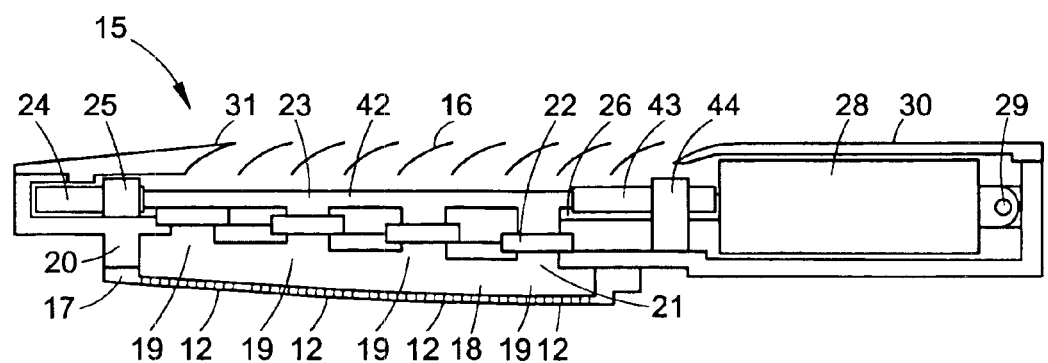
FIGS. 8a and 9a are cross-sectional views of an airflow controller, having a single bleed plenum chamber, with the sliding mechanism in the closed and open positions, respectively.
Figure 9:
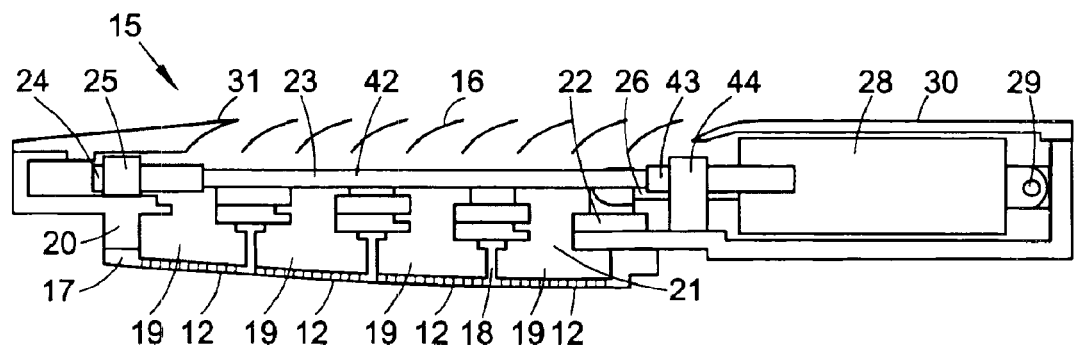
Figure 9A:
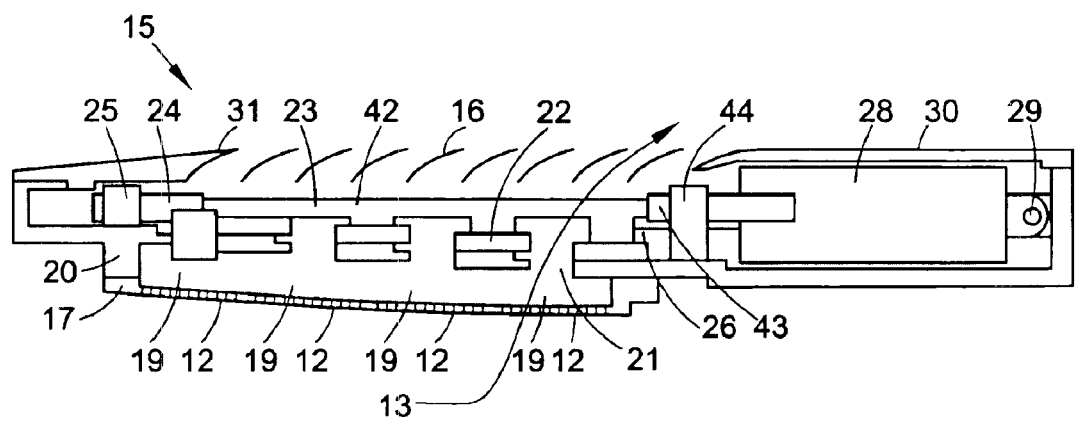

Larger scale sketches of the airflow controller 15, including multiple bleed plenum chambers 19, with the sliding mechanism 42 in the closed and open positions are presented in FIGS. 8 and 9, respectively. Larger scale sketches of the airflow controller 15, including a single bleed plenum chambers 19, with the sliding mechanism 42 in the closed and open positions are presented in FIGS. 8a and 9a, respectively. The airflow controller 15 comprises a bleed section 17 mounted to a valve support 20, and a sliding mechanism 42 slidably mounted to the valve support 20. The bleed section 17 contains a porous bleed section 12 and one or more dividers 18 forming two or more bleed plenum chambers 19. The bleed section 17 is attached to the first end of a valve support 20 which contains cutouts 21 that allow the passage of bleed airflow 13 out of the bleed plenum chambers 19.

A sliding mechanism 42 is slidably mounted to the second end of the valve support 20. The sliding mechanism 42 comprises one or more plates or blocks 22 attached to bars 23 that have guide rods 24 and 43 at the ends. The plates 22 are positionable for communication with the openings 21 of the valve support 20. FIG. 8 illustrates the plates 22 in a closed position so that air may not exit the bleed plenum chambers 19, while FIG. 9 illustrates the plates in a fully open position so that air may exit the bleed plenum chambers 19 in a desired amount. The plates 22 may be slidably positioned in numerous other positions to finely adjust the amount of exiting airflow. Thus the positioning of the plates 22 relative to the openings 21 in the support 20 determine the valve exit area.

A hydraulic cylinder 28 is attached to the valve support 20 by a bracket 29. This hydraulic cylinder 28 provides the force and translation necessary to position the sliding mechanism 42 of the valve to any desired position. For the basic airflow controller 15 design, the plates 22 may be positioned on the bars 23 in an offset or stair step arrangement. The guide rods, 24 and 43, at each end of the bars 23 slide in guide holes that are provided in support blocks 25 and 44. The guide holes include an insert to allow smooth translation of the guide rods 24 and 43 of the sliding mechanism 42. Support blocks 25 and 44 are attached to the valve support 20. Exit louvers 16 may be optionally mounted to the airflow controller covers 30 and 31. The exit louvers 16 consist of thin metal strips having a curved cross-sectional contour and spaced apart to form channels that direct the exhausted bleed airflow from the airflow controller in a near axial direction to maintain minimum drag.

Examination of FIGS. 8 and 9 shows that the bleed airflow 13 that enters any chamber 19 cannot influence the bleed airflow 13 in an adjacent chamber 19. The bleed airflow 13 from any porous region 12 is separated from the surface 12 through the plenum 19, through opening 21 in support 20, and through the opening provided by sliding mechanism 42. Then, after exiting through the opening provided by the sliding valve mechanism 42, the bleed airflow 13 from each divided airflow duct may mix in a common plenum prior to exiting through the exit louvers 16. The local pressure external to the exit louvers 16 is at a very low-pressure level and provides sufficient suction for exhaust of the bleed airflow 13. This pressure is low enough to also choke the valve exits that are created by the fixed openings 21 and the sliding surfaces 22. These choked valve exits prevent any upstream influence or back pressuring from one plenum 19 to another. The local pressure on an inlet internal duct surface is larger downstream of the terminal shock than the local inlet surface pressure upstream of the terminal shock. Therefore, referring to FIG. 6, a movement of the terminal shock 11 upstream (moving to the left on the figure) over the porous bleed surface 12 results in an increase in pressure in the plenums 19. The terminal shock 11 can move upstream in response to a decrease in engine airflow demand or in response to an external airflow disturbance such as a gust. Thus the airflow controller 15 diverts the excess airflow 13 overboard and prevents inlet unstart. The removed airflow 13 is controlled to be at a minimum during normal inlet operation and can be increased significantly during abnormal operation such as a transient in airflow demand for the engine. The pressurization of the bleed plenum 19 as the terminal shock 11 moves upstream is the reason that dividers 18 (FIGS. 8 and 9) are preferred. If one large bleed plenum were used instead of the several small plenums 19, the bleed airflow 13, with increased pressure from downstream of the terminal shock 11, recirculates to the lower pressure at the surface of a bleed region upstream of the shock and can actually blow back into the inlet. Therefore, the multiple chambered control stability valve 15 provides control of bleed flow 13 from a large actual porous bleed region 12 on the inlet cowl 3 by providing compartmentation of the bleed airflow 13 from the inner porous surface 12 to the valve exits.

The airflow controller 15 also functions to reduce high-pressure regions that occur on the inner cowl surface 5 at locations upstream of the throat region 6 (FIG. 7) during transients in the airflow 8 approaching the inlet. Transient reductions in the approach airflow 8 due to a change in flight Mach number or angle of attack causes local regions of sonic flow to occur on the inner cowl surface 5. The removal of bleed airflow 13 from the local inlet surface 5 where these pressure increases occur can greatly increase the tolerance of the inlet to these disturbances. Therefore, the airflow controller 15 can be used to function to remove bleed 13 in response to increases in local pressure due to external transients as well as movement of the terminal shock 11 as a result of internal or external airflow transients. Typically the propulsion system and inlet electronic control system would also electronically control the airflow controller 15 position in response to an increased pressure in either the most upstream bleed chamber 19 (external airflow disturbances) or the most down stream bleed chamber 19 (internal airflow disturbances).

Figure 10:
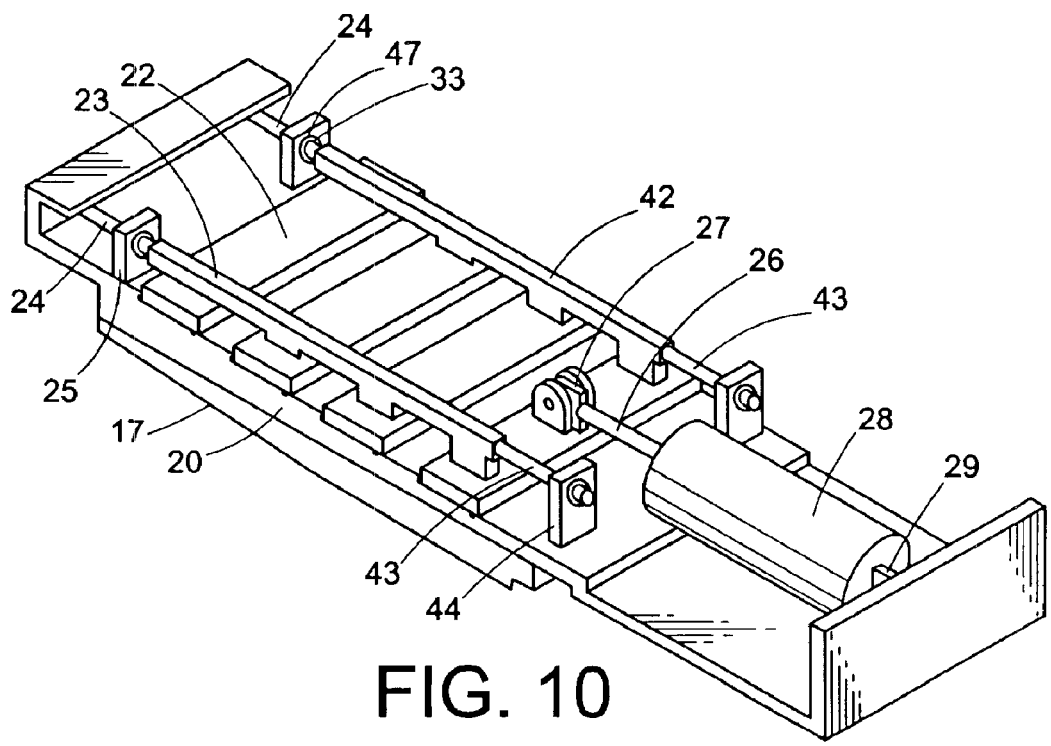
FIGS. 10 and 11 are isometric perspective views of the airflow controller with the sliding mechanism in the closed and open positions, respectively.
Figure 11:
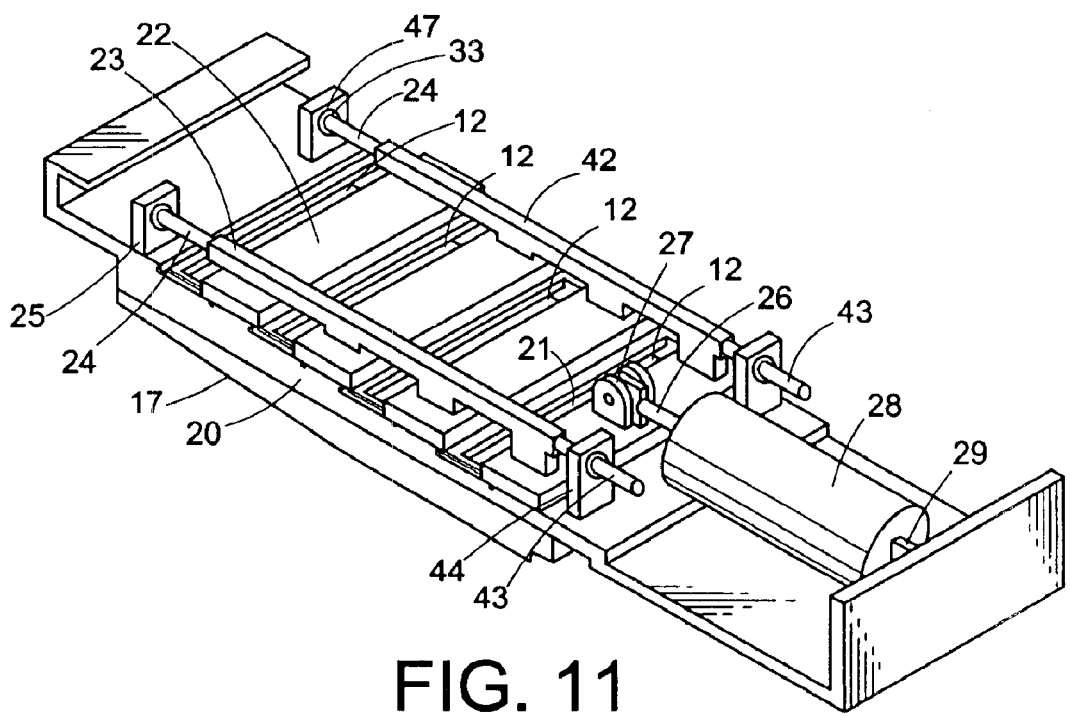

Isometric sketches of the airflow controller 15 are presented in FIGS. 10 and 11. Cowl covers 30 and 31 (FIGS. 8 and 9) are not shown in FIGS. 10 and 11. The airflow controller 15 of FIGS. 10 and 11 extends from inlet sidewall 7 to inlet sidewall 7 (FIG. 5). The airflow controller 15 replaces the cowl 3 in the throat region of the inlet 1, FIGS. 4 and 5. FIG. 10 presents a sketch in which the sliding mechanism 42 is in the closed position. FIG. 11 shows the sliding mechanism 42 in the open position. Note that the open position of the sliding mechanism 42 in FIG. 11 exposes the perforated surface 12. FIGS. 10 and 11 will be used to indicate the functioning of the sliding mechanism 42. The round guide pins 24 and 43 translating within holes 33 in supports 25 and 44 direct the movement of the sliding mechanism 42. The holes 33 contain an insert 47 to act as a bearing surface to aid in translation of the guide pins. The guide pins 25 and 43 are positioned on each side of the moveable mechanism to provide a parallel track type movement. The sliding mechanism 42 is driven by an actuation rod 26 from a hydraulic cylinder 28. The hydraulic cylinder 28 is connected to support 20 by bracket 29. As the sliding mechanism is translated downstream by a retraction of the actuation rod 26 into the hydraulic cylinder 28, the cover plates 22 slide and expose increasing valve exit area for the inlet bleed that is removed through the porous surfaces 12. Translating of the sliding mechanism 42 provides a separate exit for each of the bleed regions 12. A movement of the hydraulic cylinder regulates the bleed exit area and thus the amount of bleed. This hydraulic cylinder 28 provides the actuation power that is necessary to allow the airflow controller 15 to function as a high-response valve system.

Figure 12:
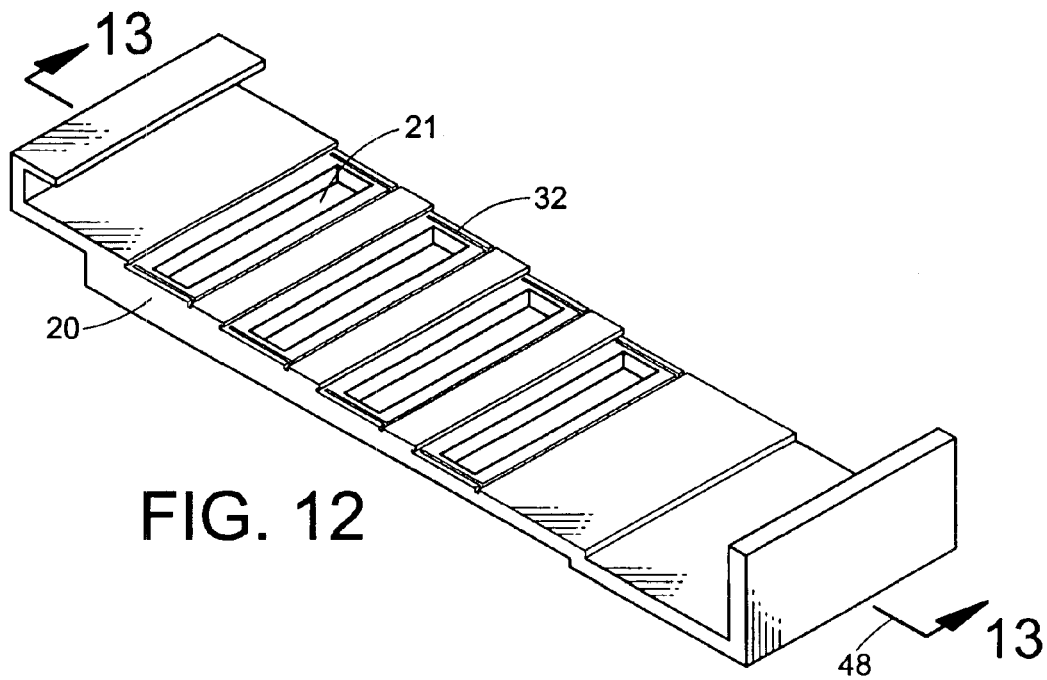
FIG. 12 is a perspective view of the valve support of the airflow controller.
Figure 13:
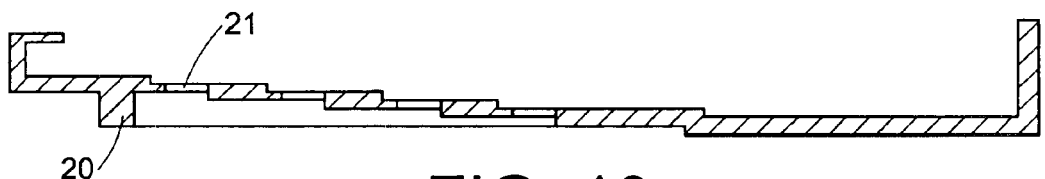
FIG. 13 is a cross-sectional view of the valve support of the airflow controller.
Figure 14:
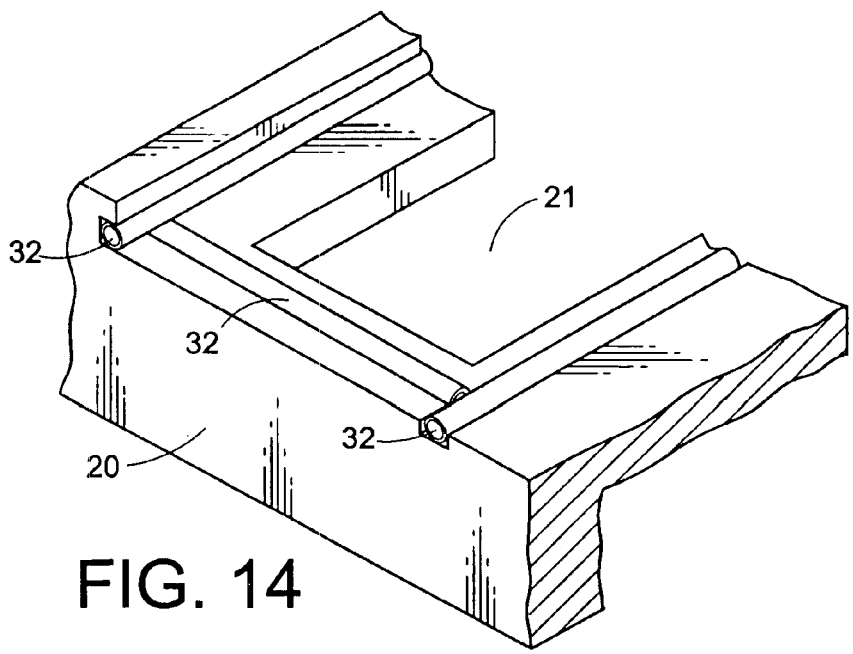
FIG. 14 is a close-up perspective view of a portion of the valve support illustrating the seal details.
Figure 15:
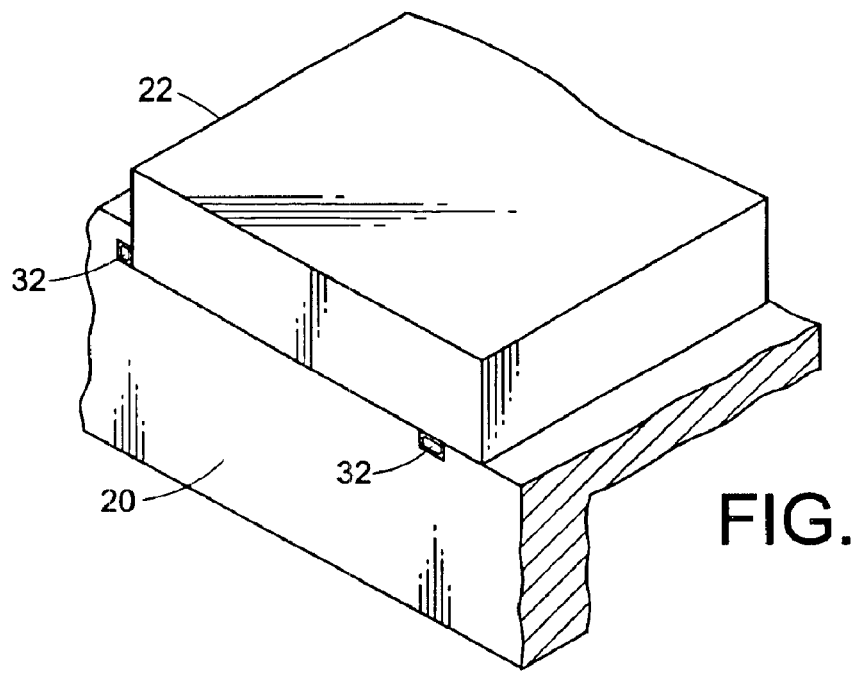
FIG. 15 is a view of FIG. 14 shown with the addition of the sliding plate block.
Figure 16:
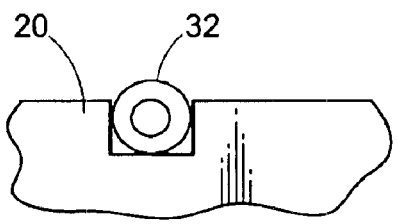
FIG. 16 illustrates an uncompressed o-ring seal mounted in a groove of the valve support of the airflow controller.
Figure 17:
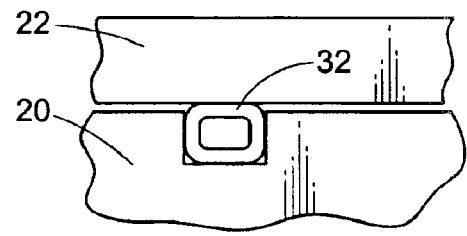
FIG. 17 illustrates an o-ring seal mounted in a groove of the valve support of the airflow controller and being compressed by the sliding bar.

Additional details for the valve support 20 are presented in FIGS. 12 through 19a. An isometric sketch of the support 20 is show in FIG. 12 with the cross section 48 presented in FIG. 13. The support 20 in FIG. 12 is the central support part of the airflow controller. Grooves 32 for seals are shown in the sketch presented in FIG. 12. Seals between the fixed support 20 and the sliding mechanism 42 of FIGS. 10 and 11 are necessary to prevent leakage. Seal details are presented in FIGS. 14 through 19a. FIG. 14 shows a portion of the valve support 20 with typical round O-ring seals 32 installed. Design, sizing, and materials of the O-ring and other seal shapes are common engineering practice and are not repeated here. However, the location of the seals is important for the airflow controller system as shown in FIG. 15. FIG. 15 is a repeat of FIG. 14 with the addition of the sliding plate block 22 of the sliding mechanism. Note that the seals on the back lip of part 20 and on the horizontal surface of the support 20 are compressed to provide a good seal to prevent airflow leakage. An O-ring seal, uncompressed and compressed by the sliding bar 22, is shown in FIGS. 16 and 17.

Figure 18:
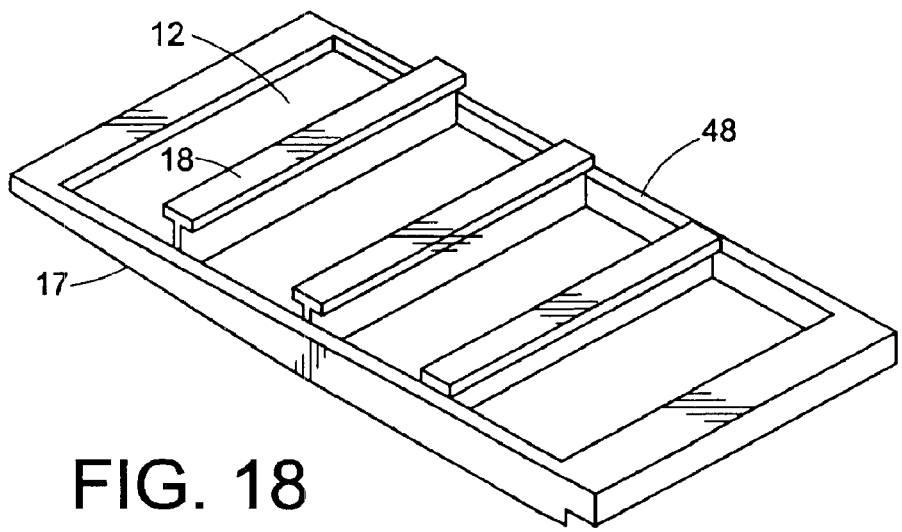
FIG. 18 is a perspective view of the bleed section of the airflow controller.
Figure 19:
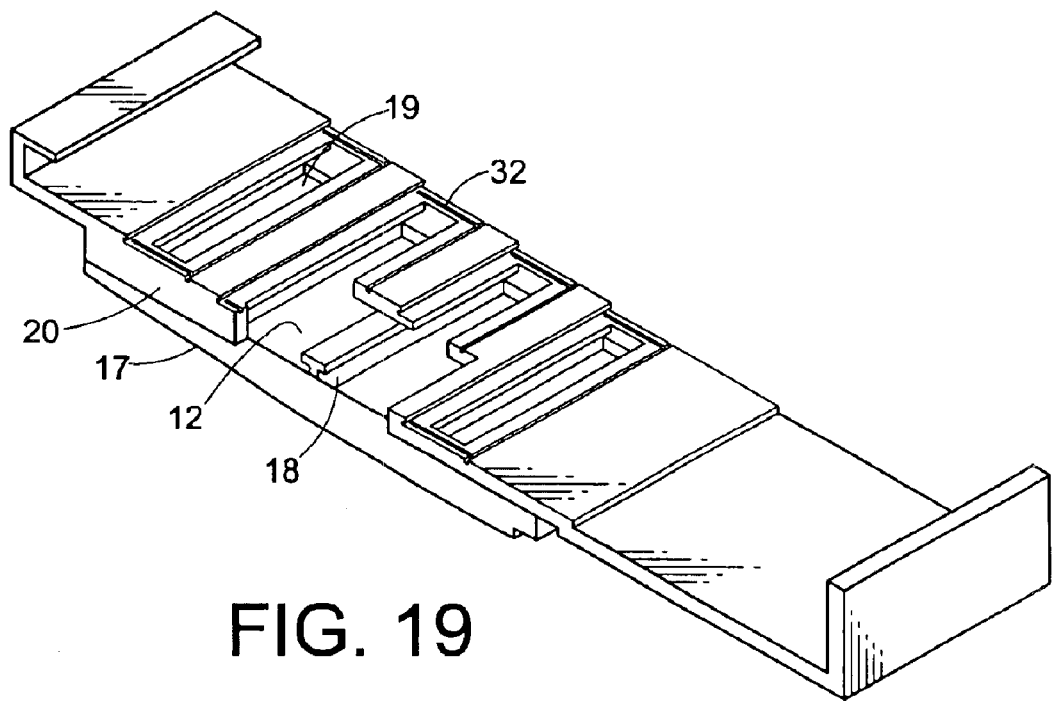
FIG. 19 is a perspective view of the bleed section mounted to the valve support of the airflow controller.
Figure 19A:
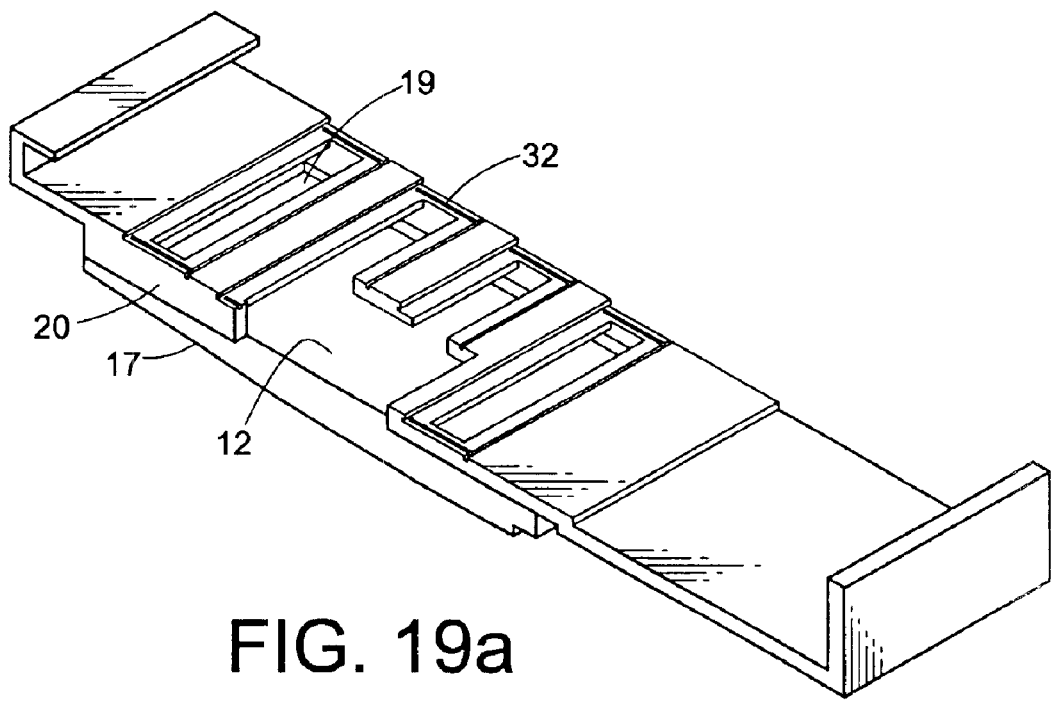
FIG. 19a is a perspective view of a bleed section, having a single bleed plenum chamber, mounted to the valve support of the airflow controller.
Figure 20:
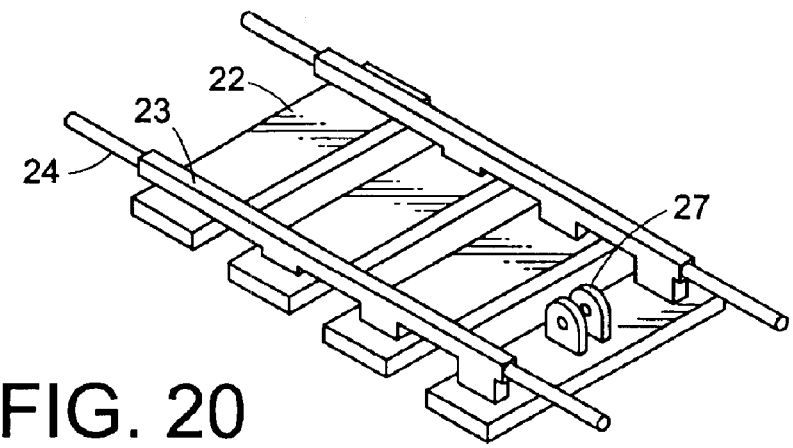
FIG. 20 is a perspective view of the slider mechanism of the airflow controller.
Figure 21:
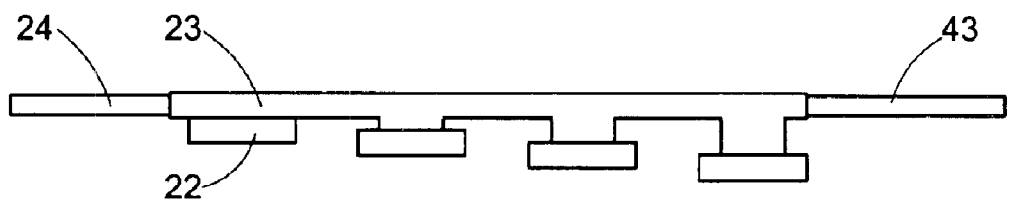
FIG. 21 is a side view of the slider mechanism of the airflow controller.
Figure 22:
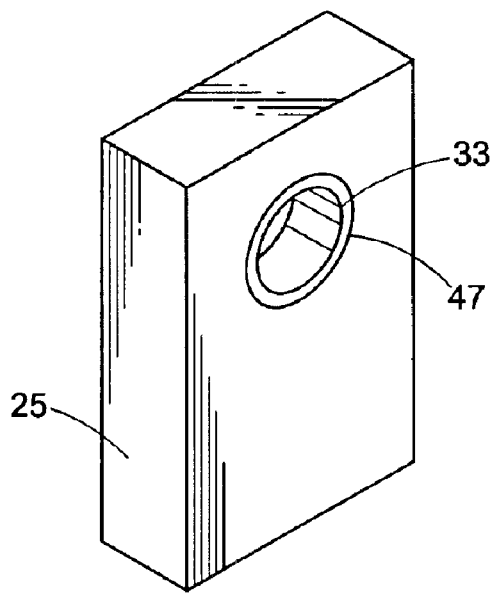
FIG. 22 is a perspective view of a support block of the airflow controller.

The sketch that is presented in FIG. 18 shows details of the bleed section 17. Attachment of the bleed section 17 to the valve support part 20 is shown in FIG. 19 (FIG. 19a shows a single bleed plenum chamber). O-ring seals are required on all of the horizontal surfaces of part 17 that mate up with surfaces on part 20. These seals that are typical to the seals presented in FIGS. 16 and 17 are located around the periphery of the horizontal surface of part 17 and along the dividers 18. Locations of the seals 48 are shown in FIG. 18. Details of the sliding mechanism 42 are shown in FIGS. 20 and 21. The support block 25 with guide hole 33 and insert 47 is presented in FIG. 22. The insert 47 is installed in the hole 33 to allow friction free movement of the sliding mechanism.

Figure 23:
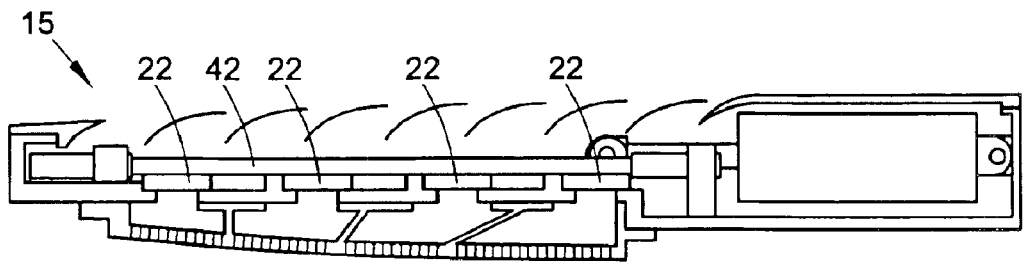
FIGS. 23 and 24 are cross-sectional views of an alternate embodiment of the airflow controller shown in the closed and open position, respectively.
Figure 24:
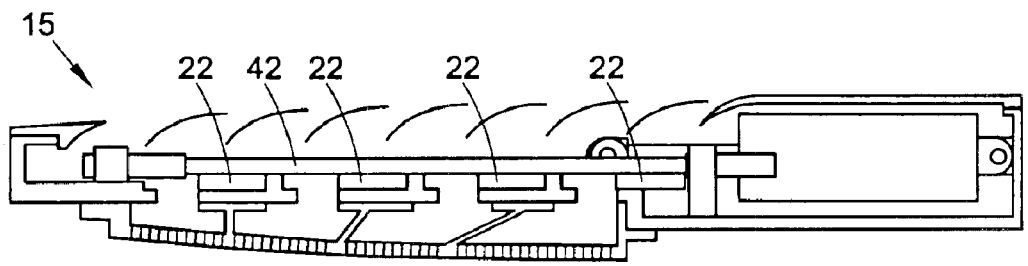

FIGS. 23 and 24 show an inline design of the sliding mechanism 42 of the airflow controller 15. The basic airflow controller 15 siding mechanism 42 includes stair stepped blocks 22. This offset or stair step design (FIGS. 1 through 24) allows a slightly shorter valve to be obtained. Referring to FIG. 8, note the stair step arrangement of the blocks 22. The inline (same level) installation of the blocks 22 on the sliding mechanism 42 of FIGS. 23 and 24 allow a airflow controller 15 design with a reduced height although it is slightly longer than the offset slider mechanism 42 of the basic design, FIG. 8.

Figure 25:
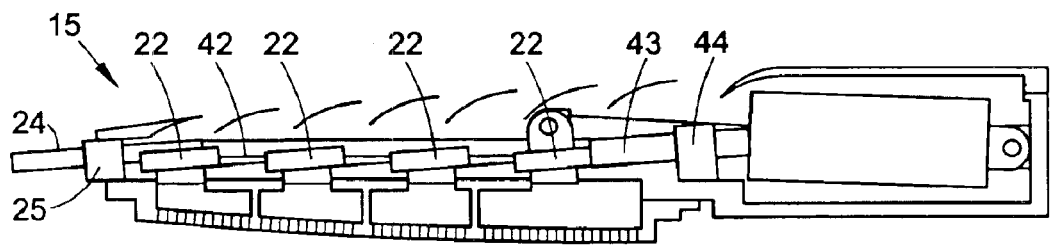
FIGS. 25 and 26 are cross-sectional views of yet another alternate embodiment of the airflow controller shown in the closed and open position, respectively.
Figure 26:
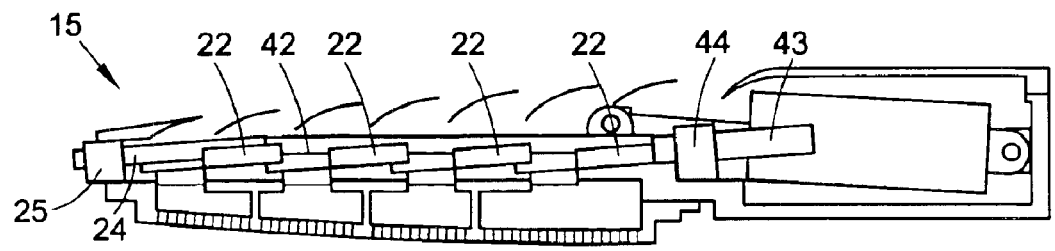

FIGS. 25 and 26 show a ramped design of the sliding mechanism 42 of the airflow controller 15. The arrangement of the blocks 22 is similar to the blocks 22 of FIG. 8. However, the guide rods 24 and 43 are parallel but offset. The support blocks 25 and 44 are positioned to allow parallel movement of these offset guide rods 24 and 43. The support blocks 25 and 44 and guide rods 24 and 43 are rotated such that the sliding mechanism 42 translates backward and upward to effect opening of the airflow controller 15. The design presented in FIGS. 25 and 26 offers a low profile airflow controller design.

It is understood that the invention is not limited to the specific embodiments herein illustrated and described, but may be used in other ways without departing from its spirit. Other embodiments of the airflow controller described above that suggest themselves to those skilled in the art are also claimed. For example, the airflow controller system described above may be used to control airflow or other fluid from any source, rather than the bleed airflow from a high-speed inlet. For example, the airflow controller can be used to control the flow of liquids from several sources by a single valve movement. These and other modifications are within the scope of this invention, which is defined by the following claims.

We claim:

1. An airflow controller for a propulsion inlet system, comprising:
   a bleed section having a bleed plenum chamber including a bleed inlet surface and an exit area; and
   a plate slidably mounted to said bleed section, the exit area being set as a function of a position of the plate.

2. The airflow controller as set forth in claim 1, wherein the bleed inlet surface is slotted.

3. The airflow controller as set forth in claim 1, wherein the bleed inlet surface is porous.

4. The airflow controller as set forth in claim 1, further including:
   a second bleed plenum chamber, including a second bleed inlet surface and a second exit area, in the bleed section; and
   a second plate slidably mounted to the second bleed section, the exit areas being set as a function of respective positions of the plates.

5. The airflow controller as set forth in claim 4, wherein the plates are controlled as a function of a pressure in one of the bleed plenum chambers.

6. The airflow controller as set forth in claim 4, wherein the plates are controlled as a function of a pressure in the bleed section.

7. The airflow controller as set forth in claim 4, further including:
   a sliding mechanism controlling the plates to substantially similar positions with respect to the respective bleed sections.

8. The airflow controller as set forth in claim 1, wherein the plate is controlled as a function of a pressure in the bleed section.

9. The airflow controller as set forth in claim 1, wherein a cross-sectional area of the bleed section is substantially rectangular.

10. The airflow controller as set forth in claim 1, wherein a cross-sectional area of the bleed section is a segment of an annulus.

11. The airflow controller as set forth in claim 1, wherein the bleed section and plate are installed on a centerbody.

12. The airflow controller as set forth in claim 1, wherein the bleed plenum chamber includes a second exit area, further including:
   a second plate slidably mounted to the bleed section, the exit areas being set as a function of respective positions of the plates.

13. An airflow controller for a propulsion inlet system, comprising:
   a bleed plenum chamber;
   means for bleeding a portion of an inlet airflow into the bleed plenum chamber;
   an exit area associated with the bleed plenum chamber; and
   a plate slidably mounted to said bleed plenum chamber, the exit area being set as a function of a position of the plate.

14. The airflow controller as set forth in claim 13, wherein the means for bleeding includes:
   an inlet surface on the bleed plenum chamber.

15. The airflow controller as set forth in claim 14, wherein the inlet surface is porous.

16. The airflow controller as set forth in claim 14, wherein the inlet surface is slotted.

17. The airflow controller as set forth in claim 14, further including:

a second bleed plenum chamber;

a second means for bleeding a portion of the inlet airflow into the second bleed plenum chamber;

a second exit area associated with the second bleed plenum chamber; and a second plate slidably mounted to the second bleed plenum chamber, the exit areas being set as a function of respective positions of the plate.

18. The airflow controller as set forth in claim 17, further including:

means for controlling the plates to substantially similar positions with respect to the respective bleed sections.

19. The airflow controller as set forth in claim 18, wherein the means for controlling is a sliding mechanism.

20. A method for controlling airflow in a propulsion inlet system, the method comprising:

receiving air into a first bleed plenum chamber via a bleed inlet surface;

determining a pressure of the first bleed plenum chamber;

receiving air into a second bleed plenum chamber via a second bleed inlet surface; and controlling a sliding mechanism for simultaneously setting respective exit areas of the bleed plenum and the second bleed plenum, including:

controlling a member via the sliding mechanism, mounted at the exit area of the first bleed plenum chamber, as a function of the pressure, for controlling a flow of the air from the first bleed plenum chamber to an outlet; and controlling a second member via the sliding mechanism, mounted to the exit area of the second bleed plenum chamber, as a function of the pressure, for controlling a flow of the air from the second bleed plenum chamber to the outlet.

21. The method for controlling airflow as set forth in claim 20, wherein the controlling steps include:

sliding the member and the second member mounted to the exit areas.

* * * * *